(12) United States Patent
Hayashi

(10) Patent No.: US 6,266,188 B1
(45) Date of Patent: Jul. 24, 2001

(54) POLARIZING BEAM SPLITTER

(75) Inventor: Kenichi Hayashi, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/536,045

(22) Filed: Mar. 27, 2000

(30) Foreign Application Priority Data

Mar. 29, 1999 (JP) ................................. 11-086024

(51) Int. Cl.$^7$ ...................................................... G02B 5/30
(52) U.S. Cl. .................... 359/495; 359/486; 359/500; 359/576
(58) Field of Search .................... 359/486, 494, 359/495, 500, 576

(56) References Cited

U.S. PATENT DOCUMENTS 5,793,733    8/1998   Takeda et al. ................ 369/112
B1 5,245,471 * 9/1993  Iwatsuka et al. ................ 359/495
B1 5,739,952 * 4/1998  Takeda et al. ................ 359/495

FOREIGN PATENT DOCUMENTS 9-230140   9/1997 (JP) .
11-66598   3/1999 (JP) .

* cited by examiner

*Primary Examiner*—Darren Schuberg
(74) *Attorney, Agent, or Firm*—Sughrue, Mion, Zinn, Macpeak & Seas, PLLC

(57) ABSTRACT

A process for producing a polarizing beam splitter includes the steps of: forming a birefringent material layer made of an oriented film of an organic polymeric material on an optically isotropic substrate; applying a first heat treatment to the birefringent material layer to cause a change in color or stabilize its molecular structure; forming a periodic grating on said birefringent material layer defined by alternativly arranging exposed and non-exposed areas by applying a patterned exposure of ultraviolet light on said birefringent material layer; and applying a second heat treatment heat to stabilize said periodic grating at a temperature not higher than that for said first heat treatment after said periodic grating is formed.

4 Claims, 3 Drawing Sheets

Forming undercoat
Orientation

Depositing Monomer

Photopolymerization
UV light

First heat treatment (color change)

Patterned exposure

Second heat treatment

Dicing

POLARIZING BEAM SPLITTER

BACKGROUND OF INVENTION

1. Field of Invention

The present invention relates to a polarizing beam splitter typically used on optical pickups with which information is written to or read from optical recording media such as optical recording disks and magneto-optical recording disks.

2. Related Art

A polarizing beam splitter capable of diffraction at varying efficiency with the direction of polarization is used on various kinds of optical devices. Inexpensive models using an optically isotropic substrate have been proposed by the assignee in Unexamined Published Japanese Patent Application Nos. 230140/1997 and 66598/1999.

The polarizing beam splitters disclosed in these patents have essentially the same structure as the polarizing beam splitter of the invention and, as shown in FIG. 1 which is a schematic representation of the invention's model, has a glass substrate 11 as an optically isotropic substrate and an oriented polydiacetylene film 12a which is formed of a birefringent material to a predetermined thickness on the surface of the glass substrate. By patterned exposure to ultraviolet light, a periodic grating 12b consisting of alternating exposed and non-exposed areas of specified width is formed in the oriented polydiacetylene film 12a.

The present inventors have found a problem with these polarizing beam splitters, that is, after the formation of the periodic grating, thermal deterioration occurs to instabilize diffraction efficiencies such as the efficiency of first-order diffraction.

A further problem occurs when the polarizing beam splitter with a periodic grating is divided into discrete units by dicing the glass substrate in a pattern of squares. Since a jet of pressurized water is applied in the dicing step, the exposed areas of the oriented polydiacetylene film come off the glass substrate.

SUMMARY OF INVENTION

An object, therefore, of the present invention is to provide a process for producing a polarizing beam splitter whose characteristics such as diffraction efficiencies are stabilized to ensure even higher quality.

There is provided a process for producing a polarizing beam splitter comprising the steps of:

forming a birefringent material layer made of an oriented film of an organic polymeric material on an optically isotropic substrate;

applying a first heat treatment to the birefringent material layer to cause a change in color or stabilize its molecular structure;

forming a periodic grating on said birefringent material layer defined by alternativly arranging exposed and non-exposed areas by applying a patterned exposure of ultraviolet light on said birefringent material layer;

applying a second heat treatment heat to stabilize said periodic grating at a temperature not higher than that for said first heat treatment after said periodic grating is formed.

According to the method of the present invention for producing a polarizing beam splitter, the formation of a periodic grating is followed by the step of second heat treatment which is performed at a temperature not higher than the temperature at which a color change occurs or the molecular structure of the grating is stabilized. In this way, the oriented film of an organic polymeric material can be thermally stabilized without causing a color change or letting the film shrink while ensuring that the film maintains the desired color. Therefore, the polarizing beam splitter produced by the process of the invention retains high values of light transmittance and the first-order diffraction efficiency.

Since the second heat treatment is conducted after forming the periodic grating by patterned exposure, the exposed areas of the periodic grating are also thermally stabilized. If the time of the second heat treatment is set with reference to the specific kind of the light source used in patterned exposure of the periodic grating, the exposed areas can be mechanically stabilized to provide better adhesion to the glass substrate with almost 100% probability. As a result, the fabricated polarizing beam splitter can safely be diced into discrete units of high quality that are free from the problem of delamination of the exposed areas.

DETAILED DESCRIPTION OF PREFERRED EMBODIMENTS

Referring to the accompanying drawings, we now describe the polarizing beam splitter of the present invention and the process for producing it.

Structure of the Polarizing Beam Splitter

Figure 1:
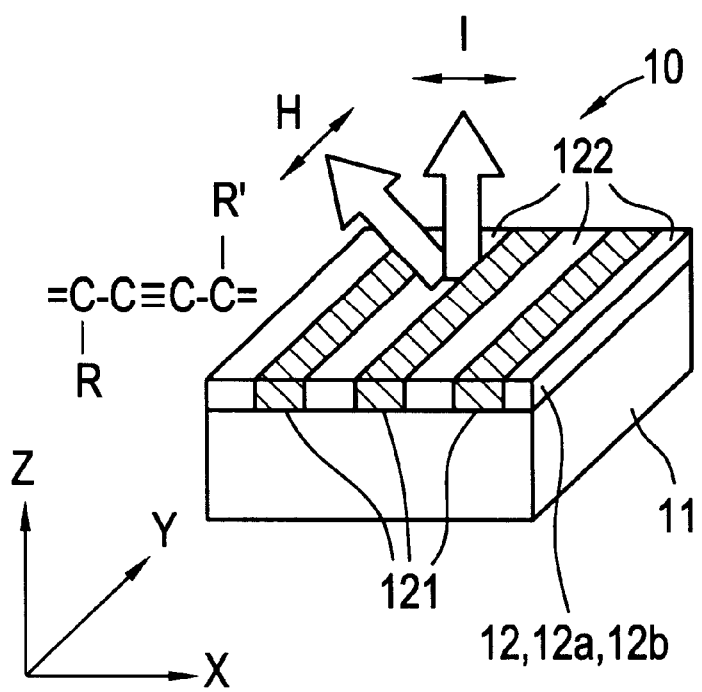
FIG. 1 is a perspective view showing schematically the structure of a polarizing beam splitter produced by the process of the invention.

FIG. 1 is a perspective view of a polarizing beam splitter produced by the process of the invention. As shown, the polarizing beam splitter generally indicated by 10 comprises an optical glass substrate 11 as an optically isotropic substrate and a birefringent material layer 12 formed to a predetermined thickness on the substrate 11. The birefringent material layer 12 is formed of an oriented polydiacetylene film 12a having the chemical formula (1) set forth below. In the case under consideration, prior to forming the oriented polydiacetylene film 12a, a film layer (not shown) for increasing the efficiency of orientation of the polydiacetylene film 12a is formed on the glass substrate 11.

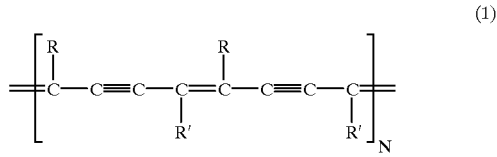
(1)

Specific examples of the polydiacetylene that can be used in the invention are those in which the side-chain groups R and $R^1$ in the chemical formula (1) are represented by the following chemical formulas (2)–(9).

(2)

-continued

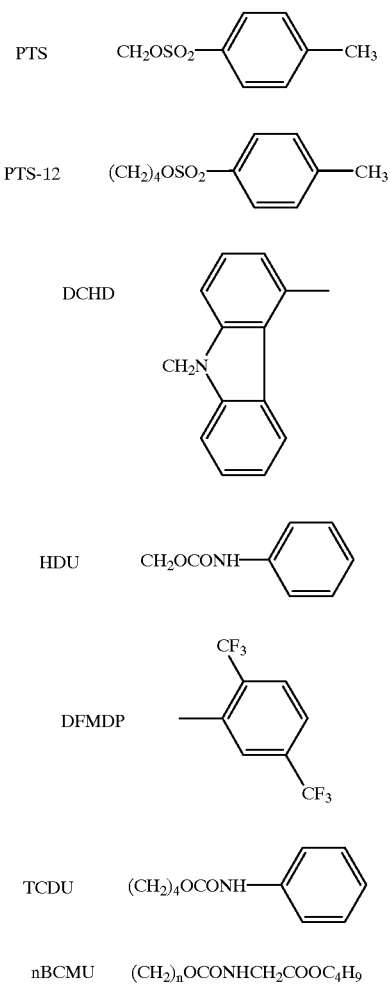

As is clear from FIG. 1, the polydiacetylene film 12a is oriented in the X-Y plane and the direction of the polymer s backbone chain (the direction of orientation) is parallel to the Y axis indicated by the two-head arrow H.

Upon illumination with ultraviolet light, the molecular chain of the oriented polydiacetylene film 12a is cleaved to cause sequential color changes to blue, red and transparency. As the result of these color changes, the refractive index of the exposed areas 122 decreases in the direction of orientation H.

This property of the oriented polydiacetylene film 12a is used in the case under consideration; it is illuminated with a predetermined pattern of ultraviolet light to form a periodic grating 12b consisting of exposed areas 122 having undergone a color change and non-exposed areas 121 which have not undergone any color change due to the absence of illumination with ultraviolet light. Specifically, the grating 12b is formed in such a way that the refractive index of the polydiacetylene film 12a in the direction of orientation periodically changes in the exposed areas 122 and the non-exposed areas 121. Therefore, in the polarizing beam splitter 10 of the case under consideration, the refractive index in the direction of orientation H periodically changes in the exposed areas 122 and the non-exposed areas 121 but the refractive index in the direction I which is normal to H changes little in the exposed areas 122 and the non-exposed areas 121. As a result, the polarizing beam splitter 10 functions as a diffraction grating to the polarized light in the direction of orientation H but transmits the polarized light in the direction I normal to H. The direction of the periodic grating 12b is determined by the direction of orientation of the polydiacetylene film 12a and, in the case under consideration, it is set to coincide with the direction of orientation.

Process for Producing the Polarizing Beam Splitter

FIGS. 2A–2C and FIGS. 3A–3D show the sequence of steps in the process of producing the polarizing beam splitter 10 of the invention.

Figure 2A:
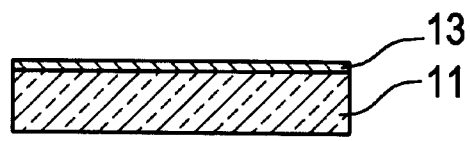
FIGS. 2A–2C show the first three steps in the process of fabricating the polarizing beam splitter shown in FIG. 1.

First, as shown in FIG. 2A, a glass plate 11 is provided. On the surface of this optically isotropic substrate, a film layer of polyethylene terephthalate (PET) working as an orienting material is formed. To make this film layer serving as an undercoat, PET is dissolved in a small amount of 1,1,2,2-hexafluoro-2-propanol to form a saturated solution, which is then diluted with 1,1,2,2-tetrachloroethane 10 folds; the precipitate is removed from the diluted solution and spin-coated onto the optically isotropic glass plate 11 at room temperature (ca., 20–30° C.). The resulting film layer is typically about 1000–2000 Å thick.

In the next step, the surface of the film layer is rubbed in one direction with a cloth of nylon, rayon or some other suitable material to make an orientation inducing film 13. One side of the glass substrate 11 may occasionally be coated with an anti-reflection (AR) film.

Figure 2B:
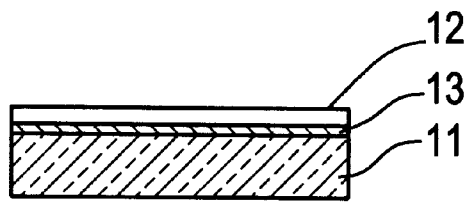

Then, as shown in FIG. 2B, a diacetylene monomer film 12 is formed on the orientation inducing film 13 by vacuum evaporation. During the vacuum evaporation, the diacetylene monomer is spontaneously oriented parallel to the orientation by the orientation inducing film 13. In the case under consideration, deposition of the diacetylene monomer by vacuum evaporation is conducted under the following conditions: temperature for resistance heating, 124–130° C.; deposition rate, 10 Å/sec–30 Å/sec; degree of vacuum, $1 \times 10^{-5}$ Torr; film thickness, ca. 100–1000 nm.

Figure 2C:
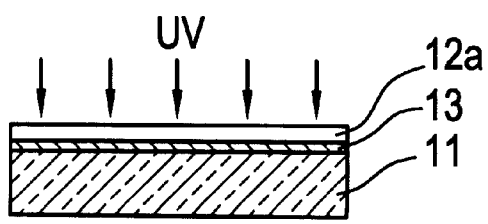

Subsequently, as shown in FIG. 2C, the diacetylene monomer film 12 is illuminated with ultraviolet (UV) light so that it is photopolymerized. For this polymerization step, a xenon mercury lamp having an output power of ca. 2 mW/cm$^2$ is turned on to produce UV illumination for a period of ca. 20 seconds. As a result, an oriented polydiacetylene film 12a of a blue color is formed.

Figure 3A:
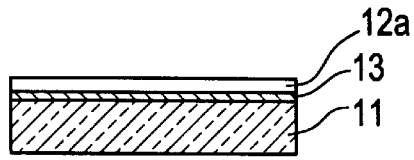
FIGS. 3A–3D show the sequence of steps that follow the process shown in FIGS. 2A–2C.

The next step is the first heat treatment which, as shown in FIG. 3A, comprises heating the oriented polydiacetylene film 12a at about 150° C. so that it changes color from blue to red.

The oriented polydiacetylene film 12a which has turned red is subjected to selective illumination with ultraviolet light so as to form a periodic grating 12b. The method of selective illumination with ultraviolet light is shown schematically in FIG. 3B; a chromium photomask 15 having the pattern of a diffraction grating is placed on top of the oriented polydiacetylene film 12a and collimated ultraviolet light is applied from above.

A xenon mercury lamp is used as the light source for selective illumination with ultraviolet light; its intensity is set to be about 20 mW/cm$^2$ and the exposure time is controlled to be about 60 minutes if the polydiacetylene film 12 has a thickness of 650 nm.

The patterning direction of the photomask 15 should form a specified angle with the orientation of the polydiacetylene film 12a. In the case under consideration, the patterning direction of the photomask 15, namely, the direction of the periodic grating 12b to be formed is set to coincide (become parallel) with the orientation of the polydiacetylene film 12a. For registration purposes, an orientation rat that has been imparted in the production of the glass substrate may be used as a pointer.

As a result of the patterned exposure to ultraviolet light, those parts of the oriented polydiacetylene film 12a which lie under the transparent areas of the photomask 15 are illuminated with ultraviolet light and have the molecular chains cleaved to undergo a color change from red to transparency. At the same time, those parts concave to produce the exposed areas 122 shown in FIG. 1. On the other hand, those parts of the polydiacetylene film 12a which lie under the opaque (light-shielding) areas of the photomask 15 do not undergo any color change and remain red to produce the non-exposed areas 121 also shown in FIG. 1. The directions of the exposed areas 122 and the non-exposed areas 121 coincide with the orientation of the polydiacetylene film 12a.

Figure 3B:
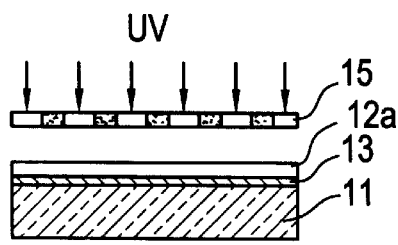
Figure 3C:
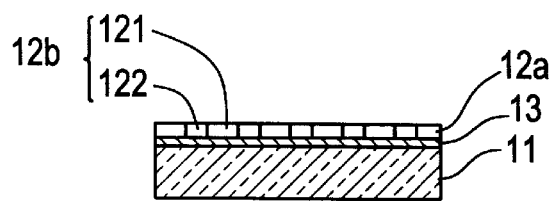

The next step is the second heat treatment which, as shown in FIG. 3C, comprises aging the entire assembly at about 140° C. for 5–10 hours. The purpose of this step is to thermally stabilize the periodic grating 12b made of the oriented polydiacetylene film 12a.

Figure 3D:
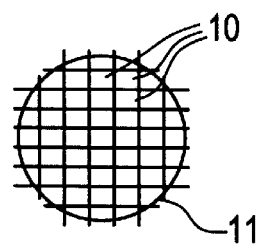

Finally, as shown in FIG. 3D, the glass substrate 11 is diced in a pattern of squares under a shower of pressurized water to divide the polarizing beam splitter 10 into discrete units. The sequence of these steps produce the polarizing beam splitter shown by 10 in FIG. 1.

Thus, the process of the present invention is characterized in that after it has been formed, the periodic grating 12b is thermally stabilized by subjecting it to the second heat treatment as shown in FIG. 3C. Because of this treatment, the fabricated polarizing beam splitter 10 has no possibility that its diffraction efficiencies vary or decrease with the lapse of time. Another advantage of the second heat treatment performed in the case under consideration is that it has no positive effect in causing a color change or that it does not stabilize the molecular structure of the oriented polydiacetylene film, thereby preventing it from shrinking. To state more specifically, the temperature condition for the second heat treatment is set to be not higher that for the first heat treatment, thereby thermally stabilizing the periodic grating made of the oriented polydiacetylene film while ensuring that it retains the desired color.

What is more, the second heat treatment is performed after patterned exposure and this offers an added advantage in that the exposed areas 122 on the glass substrate 11 are mechanically stabilized to provide better adhesion to the substrate.

To give specific data, the temperature for the second heat treatment is set at about 140° C. which is lower than 150° C. selected for the first heat treatment illustrated in FIG. 3A. At this temperature, the oriented polydiacetylene film 12a will not undergo any further color change or its molecular structure is not stabilized, thereby ensuring that it retains the desired color without shrinking. In other words, the oriented polydiacetylene film 12a is thermally stabilized and remains as it is. On the other hand, if the oriented polydiacetylene film 12a undergoes any additional color change or if it shrinks progressively, it suffers from the loss of light transmittance and first-order diffraction efficiency.

Experiments were conducted to demonstrate this point and supportive data are shown in Tables 1 and 2 below.

TABLE 1

Color and Cracking of PDA Films After Heat Treatment He-Hg lamp)

| Sample Nos. | Treatment Temperature (° C.) | Color after treatment | Cracking |
| --- | --- | --- | --- |
| 1 | 130 | Blue | None |
| 2 | 140 | Purple | None |
| 3 | 150 | Red | None |
| 4 | 160 | Red | Extensive |
| 5 | 180 | Red | Most Extensive |

TABLE 2

Relationship between the Delamination of Color-Changing Areas (Transparent Phase) and the Time of Heat Treatment. (Xe-Hg lamp at 140° C.)

| Sample Nos. | Treatment hours (h) | Delamination of color-changing areas |
| --- | --- | --- |
| 1 | 1 | more than 90% delaminated |
| 2 | 2 | more than 40% delaminated |
| 3 | 5 | 2–3% delaminated |
| 4 | 10 | None |

As FIG. 1 shows, the polarizing beam splitter 10 of the case under consideration changes from blue to red at 150° C. This means that the temperature for the second heat treatment which is performed after the formation of the periodic grating 12b is preferably not higher than about 140° C. At this temperature, no cracks develop in the oriented polydiacetylene (PDA) film of the polarizing beam splitter.

In the experiment the results of which are shown in Table 2, the time of heat treatment was varied depending upon the type of the light source for patterned exposure that was used to form the periodic grating 12b shown in FIG. 3B. The light source used in this experiment was a xenon mercury lamp. Table 2 also shows what occurred to the exposed areas 122 when the periodic grating 12b made of the oriented polydiacetylene film 12a was showered with a jet of pressurized water after the heat treatment.

As is clear from Table 2, when the xenon mercury lamp was used as a light source for patterned exposure, the adhesion between the periodic grating 12b and the glass substrate 11 improved with the increasing time of heat treatment and the delamination of the exposed areas 122 was negligible when the heat treatment was conducted for 5–10 hours. Therefore, suitable conditions for the second heat treatment are at 140° C. for 5–10 hours.

If an ultra-high pressure mercury lamp is used as the light source for patterned exposure, suitable conditions for the second heat treatment are at 140° C. for about 1 hour.

Thus, the time of the second heat treatment is preferably set with reference to the kind of the light source used to form the periodic grating 12b. The probable reason is as follows: photodegradation of a polymer occurs in the uv exposed areas 122 to produce a large amount of lower molecular weight compounds; the extent of photodegradation varies with the wavelength dispersion of the specific kind of light source with which the oriented polydiacetylene film 12a is illuminated; in addition, a xenon mercury lamp produces a larger output in the shorter wavelength range and causes photodegradation to occur in a more complicated way; this would be why the heat treatment with a xenon mercury lamp should be continued for a longer period than that with an ultra-high pressure mercury lamp in order to accomplish the intended stabilization of the exposed areas.

If the conditions for the second heat treatment, particularly its time, are set with reference to the kind of the light source used for patterned exposure, the exposed areas 122 of the periodic grating 12b can be mechanically stabilized with 100% probability. As a result, the polarizing beam splitter 10 can safely be diced into discrete units of high quality that are free from the problem of delamination of the exposed areas.

In another embodiment of the invention, the thickness of the birefringent material layer providing the oriented polydiacetylene film 12a may be set with reference to the amounts of physical asperities of the exposed areas 122 and the non-exposed areas 121 that have been created by the step of forming the periodic grating 12b and the step of the second heat treatment. This is an effective way to produce a polarizing beam splitter having the desired film thickness.

In other words, if the amounts of physical asperities as well as the difference in refractive index between the exposed areas 122 and the non-exposed areas 121 are used as factors in determining diffraction efficiencies, the degree of freedom in setting the thickness of the birefringent material layer is sufficiently increased to provide ease in fabricating a polarizing beam splitter of the desired film thickness.

In the foregoing description, a polarizing beam splitter is fabricated using polydiacetylene to form the birefringent material layer. Specifically, the side-chain groups R and R' in the polydiacetylene may be represented by the formulas (2)–(9) set forth above. Other organic polymeric materials may of course be used. However, polarizing beam splitters (HOE) fabricated from organic polymeric materials other than polydiacetylene will have the same difficulties as already mentioned above if photodegradation under exposure to uv light and other radiations is involved. To deal with this problem, the second heat treatment is applied after exposure according to the present invention and it is possible to fabricate a polarizing beam splitter of high quality that is not only stabilized in diffraction efficiencies but also free from the trouble of delamination of the exposed areas.

In the foregoing description, the conditions for the second heat treatemnt, particularly its time, are set with reference to a xenon mercury lamp or an ultra-high pressure mercury lamp which are used as the light source for patterned exposure. Of course, these are not the sole cases of the invention and other light sources such as a uv emitting fluorescent lamp or halide lamp may be employed for patterned exposure. Even in this alternative case, a polarizing beam splitter of high quality that is free from the problem of delamination of the exposed areas can be fabricated by setting the appropriate conditions for the second heat treatment with reference to the wavelength dispersion of the specific light source used.

To form the birefringent material layer made of an oriented polydiacetylene film, a diacetylene monomer is deposited on the rubbed glass substrate 11 by vacuum evaporation and subsequently photopolymerized under exposure to ultraviolet light to produce an oriented polydiacetylene film. Alternatively, PET may be deposited to form a film layer which, in turn, is coated with a vacuum evaporated diacetylene monomer in such a way that it is oriented in the direction in which the PET film layer is oriented.

As described on the foregoing pages, according to the method of the present invention for producing a polarizing beam splitter, the formation of a periodic grating is followed by the step of second heat treatment which is performed at a temperature not higher than the temperature at which a color change occurs or the molecular structure of the grating is stabilized. In this way, the oriented film of an organic polymeric material can be thermally stabilized without causing a color change or letting the film shrink while ensuring that the film maintains the desired color. Therefore, the polarizing beam splitter produced by the process of the invention retains high values of light transmittance and the first-order diffraction efficiency.

Since the second heat treatment is conducted after forming the periodic grating by patterned exposure, the exposed areas of the periodic grating are also thermally stabilized. If the time of the second heat treatment is set with reference to the specific kind of the light source used in patterned exposure of the periodic grating, the exposed areas can be mechanically stabilized to provide better adhesion to the glass substrate with almost 100% probability. As a result, the fabricated polarizing beam splitter can safely be diced into discrete units of high quality that are free from the problem of delamination of the exposed areas.

What is claimed is:

1. A process for producing a polarizing beam splitter comprising the steps of:

forming a birefringent material layer made of an oriented film of an organic polymeric material on an optically isotropic substrate;

applying a first heat treatment to the birefringent material layer to cause a change in color or stabilize its molecular structure;

forming a periodic grating on said birefringent material layer defined by alternativly arranging exposed and non-exposed areas by applying a patterned exposure of ultraviolet light on said birefringent material layer; and applying a second heat treatment heat to stabilize said periodic grating at a temperature not higher than that for said first heat treatment after said periodic grating is formed.

2. The process according to claim 1, wherein said oriented film of an organic polymeric material is an oriented polydiacetylene film.

3. The process according to claim 1, wherein a time for said second heat treatment is set with reference to the kind of the light source used for said patterned exposure.

4. The process according to claim 1, wherein the thickness of said birefringent material layer is set with reference to the amounts of physical asperities of said exposed and non-exposed areas that have been created by the step of forming said periodic grating and the step of said second heat treatment.

* * * * *